Nov. 15, 1949  H. E. PAGE  2,488,097
ELECTRIC TOASTER
Filed Oct. 17, 1944  2 Sheets-Sheet 1

INVENTOR.
Herbert E. Page
BY
Atty.

Nov. 15, 1949    H. E. PAGE    2,488,097
ELECTRIC TOASTER
Filed Oct. 17, 1944    2 Sheets-Sheet 2
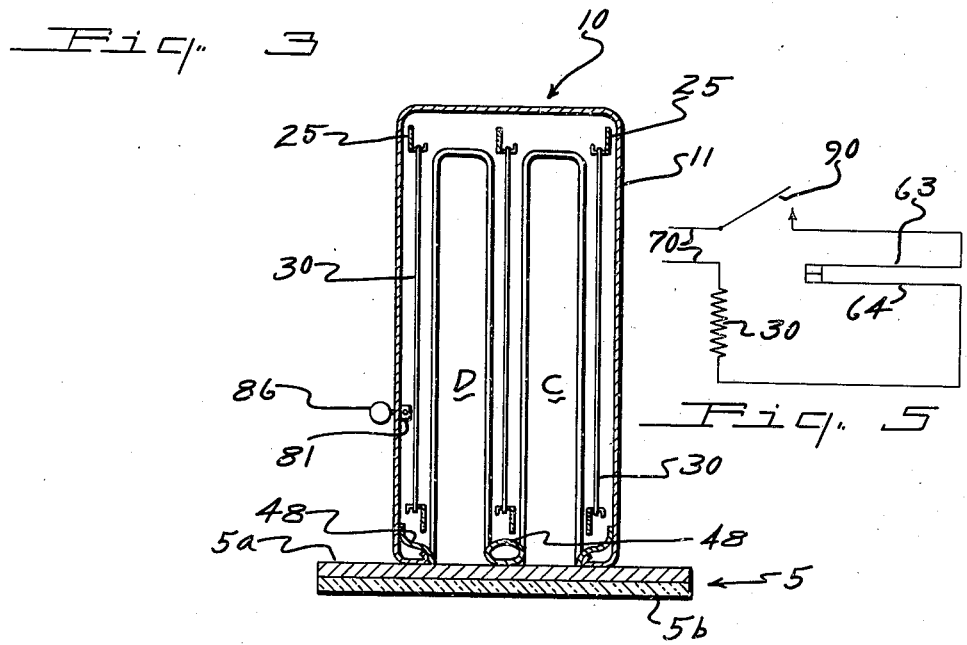
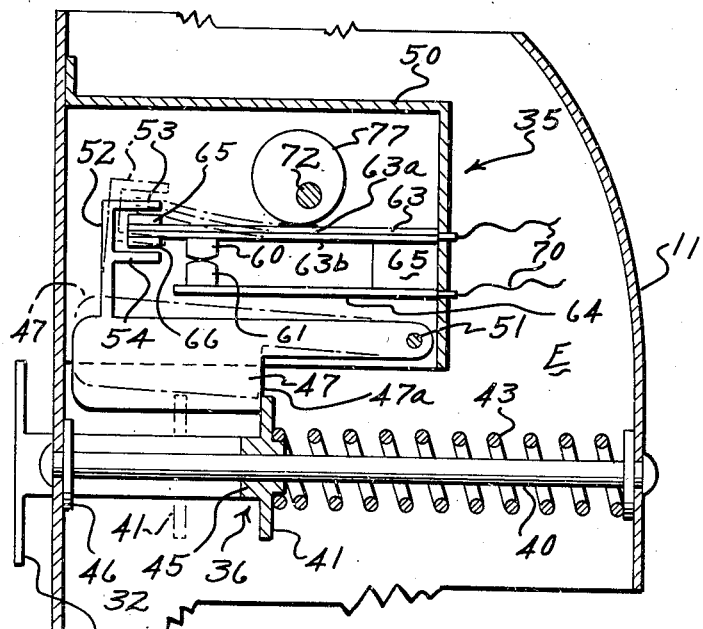
INVENTOR.
Herbert E. Page
BY
Atty Patented Nov. 15, 1949

2,488,097

UNITED STATES PATENT OFFICE 2,488,097

ELECTRIC TOASTER

Herbert E. Page, Alhambra, Calif.

Application October 17, 1944, Serial No. 559,028

1 Claim. (Cl. 99—400)

My invention has to do with automatic electric toasters for bread slices and the like.

Conventional automatic electric toasters are of a construction which tends to accumulate particles of bread in the toasting compartment and which are difficult to clean—in fact, they are of such construction that in order properly to clean them they must be practically dismantled.

It is therefore one of the prime objects of my invention to provide an electric toaster which is of such construction that it may be readily cleaned, which is economical of manufacture, and automatic in its operation.

It is also an object to provide a toaster embodying means for vibrating the heating elements to free the latter of adhering toast particles.

The invention possesses still further subordinate objects and advantages which will become obvious from the following description of one embodiment thereof which I have chosen for explanatory purposes. However, since the invention in its broader aspects as defined by the claim is capable of being embodied in various physical forms differing in detail from those now to be described, I wish it understood that the following description is to be considered merely as illustrative rather than limitative.

For purposes of the description I shall refer to the accompanying drawings, in which:

Fig. 3 is a section taken on line 3—3 of Fig. 1;

Fig. 4 is an enlarged fragmentary section taken on line 4—4 of Fig. 2; and

Fig. 5 is a diagram of the electrical circuit.

Figure 1:
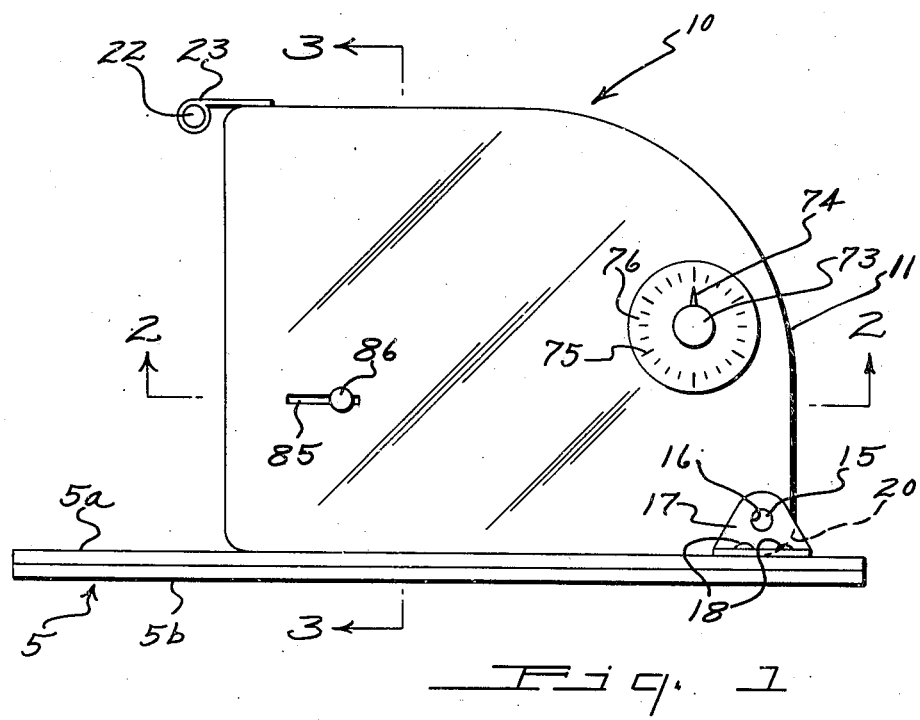
Fig. 1 is a side elevation.

Referring now to the drawings, I show at 5 a base which may have a metal top portion 5a and an insulated bottom portion 5b such as of asbestos.

The toasting element, generally designated by the numeral 10, comprises a casing 11 pivotally mounted on the base by trunnions 15 which are rotatably disposed in openings 16 in brackets 17 attached to the base by screws 18. The bottom right-hand end corner portions 20 of the casing are rounded about a radius to permit the casing to be swung upwardly about the trunnions for the purpose to be described. To facilitate this swinging operation the casing is provided with a transverse handle 22 secured to the top front portion of the casing by brackets 23.

The front part of the casing is divided into two toasting compartments C and D which open both through the front and bottom of the casing. Strung between insulating strips 25 secured to the casing and extending longitudinally of the casing walls defining the compartments, I provide resistance wires 30 which function as the heating or toasting elements.

A transverse wall 32 separates the toasting compartments from a rear compartment E in which is housed the thermostat switch 35 and the toast-ejecting mechanism 36 now to be described.

The toast-ejecting mechanism 36 consists of a bar 40 secured at its ends to the wall 32 and to the rear wall of the casing, and on which a plunger 41 is slidably mounted, the plunger being urged to the left by the coil spring 43. The plunger has two arms 44 which extend into the respective toasting compartments C, D through openings in the wall 32, and has a central abutment collar 45 which is adapted to impinge against a ring 46 mounted around bar 40 and against the wall 32 when the trigger 47 normally holding the plunger retracted is released. This impingement acts to vibrate the heating elements and thereby cause any adhering toast particles to drop onto the angled deflecting strips 48 disposed thereunder, and to be thereby deflected onto the top surface of the base.

The thermostat switch 35 consists of a casing 50 secured to wall 32 and in which trigger 47 is pivotally mounted by pin 51. Extending upwardly from the top edge of the trigger there is an arm 52 having vertically spaced lateral projections 53, 54.

Two electrical contact elements 60, 61 are mounted upon resilient arms 63, 64 which latter at their right-hand ends are secured to opposite faces of an insulating block 65, the block being in turn secured to the end wall of the casing 50.

The arm 63 is bi-metallic and electrically resistant, being composed of companion plates 63a, 63b bonded together and made of metals having relatively different coefficients of expansion. Typically, plate 63a is composed of "Invar" metal, while plate 63b is composed of chrome steel, a metal having a relatively greater coefficient of expansion than the metal of plate 63a.

Oppositely disposed insulating bumpers 65, 66 are carried respectively by the free ends of the plate 63a, 63b for alternate engagement with the arms 53, 54 to raise or lower the free end of the trigger.

As shown in the electrical diagram, the arms 63, 64 are connected into the electrical circuit leading through the heating elements by wires 70. A shaft 72 is journaled in the opposite side walls of casing 50 and extends outwardly through one side wall of the casing 11 where it carries a manual operating knob 73 having a pointer 74 selectively registerable with indicia 75 appearing on the dial 76. The shaft has secured thereon a cam 77 which bears downwardly on the arm 63 according to the direction and extent of rotation of the shaft 72.

Figure 2:
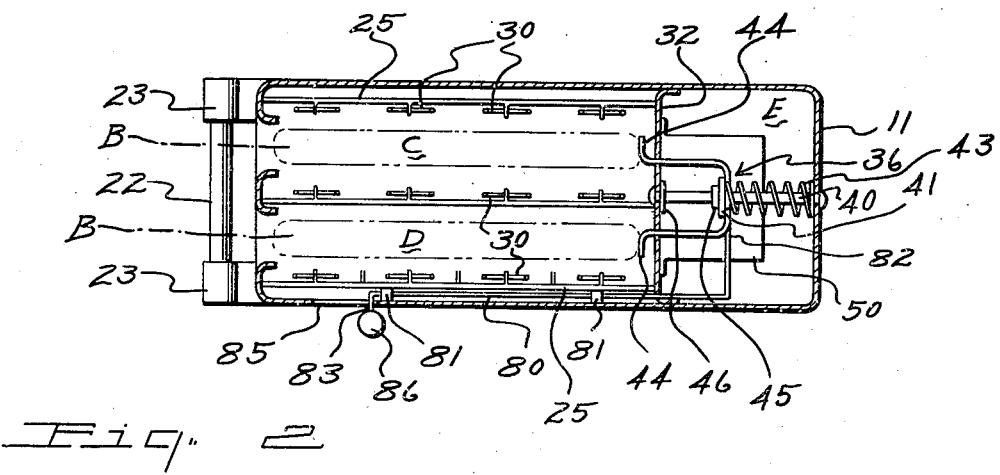
Fig. 2 is a section taken on line 2—2 of Fig. 1.

To set the plunger 41—that is, to move it to the right until it becomes locked behind the shoulder portion 47a of the trigger—I provide a bar 80 (see Fig. 2) which is slidably mounted in brackets 81 and has a right angle inner end portion 82 secured to the plunger as by spot welding. The outer end portion 83 of the rod is bent at right angles and projects through a slot 85 in a side wall of the casing 11, carrying at its extreme outer end an operating knob 86. Thus, if the rod 80 is moved to the right, it moves the plunger to the right until it is engaged behind the trigger and thus becomes locked until released. In Fig. 2, slices of bread B are shown in the compartments C, D for illustrative purposes.

The operation of the device and the cooperation and significance of the parts will become apparent from the following description of operation.

To load the compartments C, D the slices of bread are inserted through the open front end of the compartments after the plunger has been set by the rod 80 and the thermostat switch set by operating the knob 73. The parts are then in the positions shown in Figs. 2 and 4. As the bread is toasted, the arm 63, by virtue of the different coefficients of expansion of its component plates, tends to become bowed and to operate the contact elements 60, 61, this action being opposed by the cam 77, the position of which determines the extent of heat and consequent expansion necessary to finally separate the contact elements. Thus, when the desired toasting heat has been applied to the bread, the arm 63 will have bowed or become distorted to the dotted line position of Fig. 4, causing contacts 60, 61 to be disengaged and causing bumper 65 to engage arm 63, raising the trigger and releasing the plunger. Under pressure of the spring 43, the plunger suddenly strikes the member 46 to vibrate the casing and thus jar loose any bread particles tending to adhere to the heating elements, causing them to drop downwardly by gravity. At the same time the plunger arms 44 push the slices of bread from the compartments C, D through the open front end of the casing. As soon as the contact of elements 60, 61 is broken, the arm 63 cools off and resumes its normal substantially straight shape, thus causing bumper 66 to engage arm 54 and again move the trigger into position to catch the plunger when the latter is again moved to the right, the arm 63 being sufficiently resilient to permit the trigger to yield until the plunger moves into position behind the trigger face 47a. Contact of the points 60, 61 is also re-established by this latter operation. A switch 90, shown only in Fig. 5, opens and closes the circuit when the points 60, 61 are in contact.

From the foregoing it will be observed that the front and bottom of the compartments C, D may be exposed for cleaning purposes by simply swinging the casing 11 upwardly about the trunnions 15. The bread particles jarred from the heating elements by impact of the bumper as before described will have been deposited on the top surface of the base and may be simply brushed off, although if desired the interiors of the compartments may be readily brushed since they are then open at two sides.

I claim:

In a bread toaster, a horizontal base providing a support and slideway for a slice of bread, a U-shaped casing whose walls define a toasting compartment, open and unobstructed at its bottom and front whereby a slice of bread may slide into and out of the compartment along said slideway, means pivotally connecting the rear end of the casing to the base whereby the front portion of the casing may be swung towards and away from the base, heating elements in the casing at opposite sides of the compartment, and deflecting strips disposed longitudinally of the casing beneath the heating elements, said strips inclining away from the slideway whereby to deflect onto the slideway bread crumbs dropping onto the strips from the heating elements.

HERBERT E. PAGE.

REFERENCES CITED

The following references are of record in the file of this patent:

UNITED STATES PATENTS

| Number | Name | Date |
|---|---|---|
| 1,075,144 | Grearson | Oct. 7, 1913 |
| 1,363,108 | Gasaway | Dec. 21, 1920 |
| 1,543,069 | Ellis | June 23, 1925 |
| 1,543,362 | Boletino | June 23, 1925 |
| 1,624,893 | Marsden | Apr. 12, 1927 |
| 1,694,762 | Ackerman | Dec. 11, 1928 |
| 1,746,698 | Galer | Feb. 11, 1930 |
| 1,901,603 | Juengst et al. | Mar. 14, 1933 |
| 1,907,650 | McLelland et al. | May 9, 1933 |
| 1,931,345 | Fitzgerald | Oct. 17, 1933 |
| 1,937,562 | Ginder | Dec. 5, 1933 |
| 2,092,226 | Simons | Sept. 7, 1937 |
| 2,234,764 | Ireland | Mar. 11, 1941 |
| 2,329,937 | Orkfritz | Sept. 21, 1943 |
| 2,344,842 | Weeks | Mar. 21, 1944 |